(12) United States Patent
Takayama et al.

(10) Patent No.: US 7,357,769 B2
(45) Date of Patent: Apr. 15, 2008

(54) MACHINE TOOL

(75) Inventors: Naoshi Takayama, Yamatokoriyama (JP); Michio Watanabe, Yamatokoriyama (JP); Nobuyuki Kimura, Yamatokoriyama (JP); Kazuyuki Hiramoto, Yamatokoriyama (JP); Takayuki Akai, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 125 days.

(21) Appl. No.: 11/420,010

(22) Filed: May 24, 2006

(65) Prior Publication Data

US 2006/0270540 A1    Nov. 30, 2006

(30) Foreign Application Priority Data

May 25, 2005 (JP) ............................. 2005-152369
May 31, 2005 (JP) ............................. 2005-158968

(51) Int. Cl.
*B23Q 3/157* (2006.01)

(52) U.S. Cl. .............................. 483/41; 483/14; 483/3; 409/202; 409/212; 409/235; 29/27 C; 29/563

(58) Field of Classification Search ............... 483/3, 483/14, 16, 30, 31, 36, 39, 40, 41; 29/27 C, 29/27 R, 561, 563; 409/134, 165, 166, 167, 409/190, 191, 202, 212, 219, 230, 235; 82/122, 82/125; 408/234, 241 G
See application file for complete search history.

(56) References Cited

U.S. PATENT DOCUMENTS

| | | | |
|---|---|---|---|
| 5,786,557 A * | 7/1998 | Girardin | 219/69.11 |
| 6,068,431 A * | 5/2000 | Line | 409/202 |
| 6,641,341 B2 * | 11/2003 | Sato et al. | 409/235 |
| 6,698,982 B2 * | 3/2004 | Watanabe et al. | 409/235 |
| 6,719,506 B2 * | 4/2004 | Chang et al. | 409/201 |
| 6,798,088 B2 * | 9/2004 | Hsu et al. | 409/235 |
| 6,811,361 B2 * | 11/2004 | Sugata et al. | 409/134 |
| 7,013,543 B2 * | 3/2006 | Iwabuchi et al. | 29/27 C |
| 7,013,544 B2 * | 3/2006 | Yasuda et al. | 29/27 C |
| 7,018,147 B2 * | 3/2006 | Hiramoto et al. | 409/134 |
| 7,108,647 B2 * | 9/2006 | Nakazawa et al. | 483/14 |
| 7,159,294 B2 * | 1/2007 | Yamazaki et al. | 29/564 |
| 7,172,375 B2 * | 2/2007 | Tanoue et al. | 409/202 |
| 7,201,546 B2 * | 4/2007 | Ichino et al. | 409/165 |
| 7,220,090 B2 * | 5/2007 | Wakazono et al. | 409/235 |

(Continued)

FOREIGN PATENT DOCUMENTS

JP    2001-087964 A    4/2001

*Primary Examiner*—Dana Ross
(74) *Attorney, Agent, or Firm*—Judge Patent Assoc.

(57) ABSTRACT

Machine tool simplifying maintenance, reducing manufacturing costs, and enabling high precision machining. The machine tool is equipped with: a bed furnished with a rectangular base, right and left sidewalls provided standing either side of the base, and a rear sidewall provided standing along the back of the base; a table disposed in the space surrounded by the three sidewalls; a first saddle shaped in the form of a rectangular frame shape, provided free to shift back and forth supported on the tops of the left and right sidewalls; a second saddle penetrated by a perpendicular through-hole and arranged free to shift sideways inside the first saddle frame; and a spindle head arranged free to shift perpendicularly inside the through-hole in the second saddle; and a main spindle arranged over the table and supported by the spindle head free to rotate centered on its axis.

9 Claims, 8 Drawing Sheets

U.S. PATENT DOCUMENTS 7,232,406 B2 * 6/2007 Komizo ......................... 483/3
7,237,310 B2 * 7/2007 Sasazawa et al. ........... 29/27 C
7,240,411 B2 * 7/2007 Matsumoto et al. ........ 29/27 C
7,255,519 B2 * 8/2007 Tanoue et al. .............. 409/135

* cited by examiner

MACHINE TOOL

BACKGROUND OF THE INVENTION

1. Technical Field

The present invention relates to machine tools furnished with: a bed; a table on which a workpiece is carried and which is disposed on the bed; a main spindle for retaining a tool, and provided, with its axis disposed perpendicularly, to rotate freely centered on the axis; and a feed mechanism for shifting the table and the main spindle relatively to each other along three orthogonal axes.

2. Description of the Related Art

Such machine tools known to date include the example disclosed in Japanese Unexamined Patent App. Pub. 2001-87964. This machine tool primarily is made up of: a bed; a column arranged on the bed; a saddle that is supported on the front of the column and is shiftable horizontally (along the X-axis); a spindle head that is supported on the saddle and is shiftable vertically (along the Z-axis); a main spindle for retaining a tool and being supported by the spindle head so that the axis of the main spindle is perpendicular and the main spindle is rotatable about the main spindle axis; and a table on which a workpiece is carried, the table being arranged on the upper face of the bed and provided below the main spindle, provided to be shiftable along an axis (the Y-axis) that is orthogonal in the horizontal plane to the course along which the saddle shifts.

This machine tool also has a rotational drive mechanism for rotating the main spindle on the main spindle axis, an X-axis guide mechanism for guiding movement along the X-axis of the saddle, a Z-axis guide mechanism for guiding movement along the Z-axis of the spindle head, a Y-axis guide mechanism for guiding movement along the Y-axis of the table, an X-axis feed mechanism for moving the saddle on the X-axis, a Z-axis feed mechanism for moving the spindle head on the Z-axis, a Y-axis feed mechanism for moving the table on the Y-axis, a machine tool cover that is attached to the bed and surrounds the machine tool, an X-axis cover disposed in front of the cover, a Z-axis cover disposed in front of the cover, a Y-axis cover disposed above the bed, and a guide cover disposed above the bed on both sides of the table on the X-axis.

The X-axis guide mechanism comprises a first X-axis guide surface formed along the X-axis in front of the column, and a second X-axis guide surface formed behind the saddle so that the second X-axis guide surface connects with the first X-axis guide surface. The Z-axis guide mechanism comprises a first Z-axis guide surface formed along the Z-axis in front of the saddle, and a second Z-axis guide surface formed behind the spindle head so that the second Z-axis guide surface connects with the first Z-axis guide surface. The Y-axis guide mechanism comprises a first Y-axis guide surface formed along the Y-axis above the bed, and a second Y-axis guide surface formed below the table so that the second Y-axis guide surface connects with the first Y-axis guide surface.

The X-axis feed mechanism comprises an X-axis drive motor disposed to the column, an X-axis ball screw disposed along the X-axis in front of the column and axially rotated by the X-axis drive motor, and an X-axis nut that is affixed to the back of the saddle and screws onto the X-axis ball screw. The Z-axis feed mechanism comprises a Z-axis drive motor disposed to the saddle, a Z-axis ball screw disposed along the Z-axis in front of the saddle and axially rotated by the Z-axis drive motor, and a Z-axis nut that is affixed to the back of the spindle head and screws onto the Z-axis ball screw. The Y-axis feed mechanism comprises a Y-axis drive motor disposed to the bed, a Y-axis ball screw disposed along the Y-axis above the bed and axially rotated by the Y-axis drive motor, and a Y-axis nut that is affixed to the bottom of the table and screws onto the Y-axis ball screw.

The X-axis cover is a telescopic cover disposed in front of the column to allow movement of the saddle along the X-axis with both side portions and the top portion of the cover connected to the inside of the machine tool cover. The Z-axis cover is a roll-up cover disposed in front of the saddle covering the Z-axis guide mechanism and the Z-axis feed mechanism to allow movement of the spindle head along the Z-axis. The Y-axis is a telescopic cover disposed above the bed covering the Y-axis guide mechanism and Y-axis feed mechanism to allow movement of the table along the Y-axis, and is rendered so that the top of the Y-axis cover declines to both sides from the middle portion of the Y-axis cover on the X-axis. The covers prevent chips, swarf and other cutting waste and cutting fluid from flying outside the machine tool and from entering the X-axis guide mechanism and X-axis feed mechanism, the Z-axis guide mechanism and Z-axis feed mechanism, and the Y-axis guide mechanism and Y-axis feed mechanism.

The guide cover is disposed below the X-axis cover, the Z-axis cover, and the Y-axis cover, and guides waste and cutting fluid into a collection box located below drain holes appropriately formed in the bed along the X-axis on both sides of the table.

When the X-axis drive motor in this machine tool rotates the X-axis ball screw and the X-axis nut moves along the X-axis ball screw, the saddle moves along the X-axis guided by the first X-axis guide surface and the second X-axis guide surface. When the Z-axis drive motor rotates the Z-axis ball screw and the Z-axis nut moves along the Z-axis ball screw, the spindle head moves along the Z-axis guided by the first Z-axis guide surface and the second Z-axis guide surface. When the Y-axis drive motor rotates the Y-axis ball screw and the Y-axis nut moves along the Y-axis ball screw, the table moves along the Y-axis guided by the first Y-axis guide surface and the second Y-axis guide surface. The rotational drive mechanism drives the main spindle rotationally on the main spindle axis. The workpiece held on the table is thus processed by the tool held in the main spindle as the saddle, spindle head, and table move on their respective axes while the main spindle rotates on the main spindle axis.

Waste produced by machining the workpiece and cutting fluid supplied appropriately to the point of contact between the tool and the workpiece during processing are also prevented from entering the X-axis guide mechanism and X-axis feed mechanism, the Z-axis guide mechanism and Z-axis feed mechanism, and the Y-axis guide mechanism and Y-axis feed mechanism by the X-axis cover, the Z-axis cover, and the Y-axis cover, respectively, and from flying outside the machine tool by the machine tool cover.

In addition, waste and cutting fluid also fall down along the inside surface of the machine tool cover, the X-axis cover, and the Z-axis cover, and are guided downward to both sides along the X-axis by the inclined surface of the top of the Y-axis cover. The waste and cutting fluid then fall onto the top of the guide cover whereby they are guided towards the collection box and exit.

With this conventional machine tool, the Y-axis guide mechanism that guides table movement and the Y-axis feed mechanism that moves the table are located below the top of the table, and waste and cutting fluid always flow over the top of the Y-axis cover. Waste and cutting fluid can therefore enter the Y-axis guide mechanism and Y-axis feed mechanism more easily than the X-axis guide mechanism and X-axis feed mechanism or the Z-axis guide mechanism and Z-axis feed mechanism. As a result, the Y-axis cover requires frequent maintenance, or requires using a complicated and costly construction.

Another problem with the conventional technology is that the heavy saddle is supported at the front of the column and the similarly heavy spindle head is supported at the front of the saddle with the saddle and spindle head protruding to the front of the machine tool. This results in deflection or deformation of the column or saddle and thus prevents high precision machining.

BRIEF SUMMARY OF THE INVENTION

The present invention is directed to solving these problems, and an object of the invention is to provide a machine tool that affords easy maintenance, reduces manufacturing cost, and enables high precision processing.

To achieve this object, a machine tool according to a preferred aspect of the invention comprises: a bed comprising a rectangular base, two sidewalls rising vertically from opposing left and right sides of the base across an interval between the sidewalls, and a rear sidewall disposed at the back vertically to the base between the right and left sidewalls; a table disposed to the bed in a space surrounded by the three sidewalls of the bed; a first saddle having a rectangular frame shape with both lengthwise end parts supported by a top portion of the left and right sidewalls of the bed, and disposed freely movably back and forth in a horizontal plane; a second saddle disposed freely movably side-to-side in a horizontal plane inside the frame of the first saddle, and comprising a vertical through-hole; a spindle head disposed freely movably vertically inside the through-hole of the second saddle; a main spindle disposed above the table with the main spindle axis vertical and the main spindle supported by the spindle head freely rotatably on the main spindle axis; a first guide mechanism for guiding the first saddle back and forth; a second guide mechanism for guiding the second saddle side-to-side; a third guide mechanism for guiding vertical movement of the spindle head; a first feed mechanism for moving the first saddle back and forth; a second feed mechanism for moving the second saddle side-to-side; a third feed mechanism for moving the spindle head vertically; and a first rotation drive mechanism for rotating the main spindle on the main spindle axis.

With the machine tool according to this aspect of the invention the first saddle is guided by the first guide mechanism and moved back and forth by the first feed mechanism, the second saddle is guided by the second guide mechanism and moved side-to-side by the second feed mechanism, the spindle head is guided by the third guide mechanism and moved vertically by the third feed mechanism, the main spindle is driven rotationally on its axis by the first rotation drive mechanism, and the work held on the table is thus machined by the tool held by the main spindle.

In a machine tool according to this aspect of the invention the table is disposed inside the space enclosed by the three sidewalls of the bed, both ends of the long sides of the first saddle are supported and move freely back and forth on top of the right and left sidewalls of the bed, the second saddle is disposed movably side-to-side (right and left) inside the frame of the first saddle, and the spindle head is disposed to move vertically inside the through-hole in the second saddle. As a result, the first saddle, the second saddle, and the spindle head can also be disposed above the top of the table.

A machine tool according to this invention therefore makes it more difficult for waste and cutting fluid to enter the first feed mechanism and first guide mechanism, the second feed mechanism and second guide mechanism, and the third feed mechanism and third guide mechanism when compared with a prior art machine tool in which the feed mechanism for moving the table and the guide mechanism for guiding table movement are disposed below the top of the table. The manufacturing cost and construction of the cover that prevents waste and cutting fluid from entering the slide and guide mechanisms can thus be reduced, and cover maintenance can be simplified.

Furthermore, the first saddle is rendered with a rectangular frame shape, the second saddle is disposed inside the frame of the first saddle, and the spindle head is disposed inside a through-hole formed vertically through the second saddle. Unlike the prior art machine tool, the saddle therefore does not project from the front and a support structure for the spindle head is not needed. Deflection and other deformation of the bed, first saddle, and second saddle are thus prevented, and work can be machined with high precision.

Furthermore, by rendering a recess at the front outside surface between the ends of the long sides of the first saddle, the front outside surface of the first saddle can be prevented from striking a worker working at the front of the bed when the first saddle moves to the front side of the bed.

In another aspect of the invention the table is supported by the rear sidewall of the bed, can rotate freely on an axis of rotation perpendicular to the top surface of the table, and can swivel freely on a swivel axis parallel to the direction of first saddle movement. In addition, the machine tool further comprises: a second rotation drive mechanism for rotating the table on the axis of rotation and indexing the table to a specific rotational angle position; and a swivel drive mechanism for swiveling the table on the swivel axis and indexing the table to a specific swivel angle position.

The table can be rotated on the axis of rotation and indexed to a specific rotational angle position by means of the second rotation drive mechanism, and can be rotated on the swivel axis and indexed to a specific swivel angle position by means of the swivel drive mechanism, to index the work on the table to an appropriate position. The work therefore needs to be mounted on the table only once in order to complete a processing sequence including machining the outside of the work, thus improving efficiency and machining precision.

In a machine tool according to another aspect of the invention the bed comprises a tool changing opening passing from the outside to the inside through any one of the right, left, and rear sidewalls, and the machine tool further comprises a tool changing device for carrying tools in and out through the tool changing opening, and replacing a tool held in the main spindle with a new tool.

Tools can thus be changed efficiently by means of the tool changing device replacing the tool held by the main spindle with a new tool. Furthermore, because the desired new tool can be delivered through the tool changing opening rendered in any one of the sidewalls of the bed, and the replaced tool that was held by the main spindle can be removed through the tool changing opening, the tool changing device does not interfere with the performance of a worker working at the front of the bed.

In a machine tool according to another aspect of the invention the bed comprises a pallet changing opening passing from the outside to the inside through any one of the right, left, and rear sidewalls, and the machine tool further comprises a pallet changing device for carrying pallets in and out through the pallet changing opening, and replacing a pallet holding processed work on the table with a new pallet holding unprocessed work.

Pallets can thus be changed efficiently by means of the pallet changing device replacing the pallet holding processed work on the table with a new pallet holding unprocessed work. Furthermore, because the new pallet can be delivered through the pallet changing opening rendered in any one of the sidewalls of the bed, and the replaced pallet that was held on the table can be removed through the pallet changing opening, the pallet changing device does not interfere with the performance of a worker working at the front of the bed.

In a machine tool according to another aspect of the invention the bed comprises a pallet changing opening passing from the outside to the inside through any two of the right, left, and rear sidewalls, and the machine tool further comprises a pallet changing device for carrying pallets in from one pallet changing opening and out through the other pallet changing opening, and replacing a pallet holding processed work on the table with a new pallet holding unprocessed work.

This arrangement enables delivering the new pallet through one of the two pallet changing openings rendered in any two of the sidewalls of the bed, and removing the replaced pallet fixed to the table from the other pallet changing opening. As a result, pallets can be changed efficiently by means of the pallet changing device and the pallet changing device does not interfere with the performance of a worker working at the front of the bed.

A machine tool according to another aspect of the invention also has a discharge means disposed below the table for discharging fluid toward the table, and a fluid supply means for supplying and discharging the fluid from the discharge means. The swivel drive mechanism can swivel the table in at least one table swiveling direction between a first swivel angle position where the top of the table is horizontal and a second swivel angle position where the table top is swiveled 90 degrees or more from the first swivel angle position, and the discharge means discharges fluid supplied from the fluid supply means toward the table swiveled to the second swivel angle position by the swivel drive mechanism.

When processing the work is finished, the swivel drive mechanism swivels the table to the second swivel angle position rotated 90 degrees or more from the first swivel angle position, and fluid is then supplied by the fluid supply means and discharged from the discharge means.

The direction in which the fluid is discharged from the discharge means is toward the table after the table has been swiveled to the second swivel angle position by the swivel drive means, and waste left on the table or on the work held on the table is removed by the fluid discharged from the discharge means. This causes the waste to fall so that it can be efficiently removed. Production costs can also be reduced because a special device for removing waste accumulated on or adhering to the work is not needed.

Alternatively, the discharge means can be rendered to discharge the fluid supplied from the fluid supply means toward the table after the table is swiveled by the swivel drive mechanism to a swivel angle position of 90 degrees or more from the first swivel angle position, and the fluid supply means can be rendered to supply the fluid to the discharge means while the table is being swiveled by the swivel drive mechanism from a swivel angle position of 90 degrees or more toward the second swivel angle position.

In this aspect of the invention the fluid is discharged from the discharge means while the table is swiveling and the table swivels through the streams of discharged fluid. Swiveling the table and removing waste by discharging fluid thus proceed in parallel, and the waste can be remove in less time and more efficiently.

In another aspect of the invention the bed has a waste discharge opening of which one end opens to the top of the base and the other end opens to the outside of the bed, and the machine tool further comprises a waste recovery means disposed inside the waste discharge opening for recovering waste falling from the open portion in the top of the base of the bed.

Waste can thus be efficiently discharged from the one end of the waste discharge opening rendered below and around the table in the top of the base of the bed, and can be recovered into the waste recovery means.

A machine tool according to the present invention thus renders the first saddle, second saddle, and spindle head movable in respective specific slide directions at a position above the top of the table, thus making it difficult for waste and cutting fluid to enter the first feed mechanism and first guide mechanism, the second feed mechanism and second guide mechanism, and the third feed mechanism and third guide mechanism. The construction and manufacturing cost of covers used to prevent such unwanted penetration of waste and cutting fluid can therefore be reduced and cover maintenance can be simplified.

Furthermore, because the second saddle is rendered inside the frame of the first saddle and the spindle head is disposed in a through-hole in the second saddle, the first saddle and second saddle are more resistant to deflection and other deformation, thus affording high precision machining.

From the following detailed description in conjunction with the accompanying drawings, the foregoing and other objects, features, aspects and advantages of the present invention will become readily apparent to those skilled in the art.

DETAILED DESCRIPTION OF THE INVENTION

Figure 1:
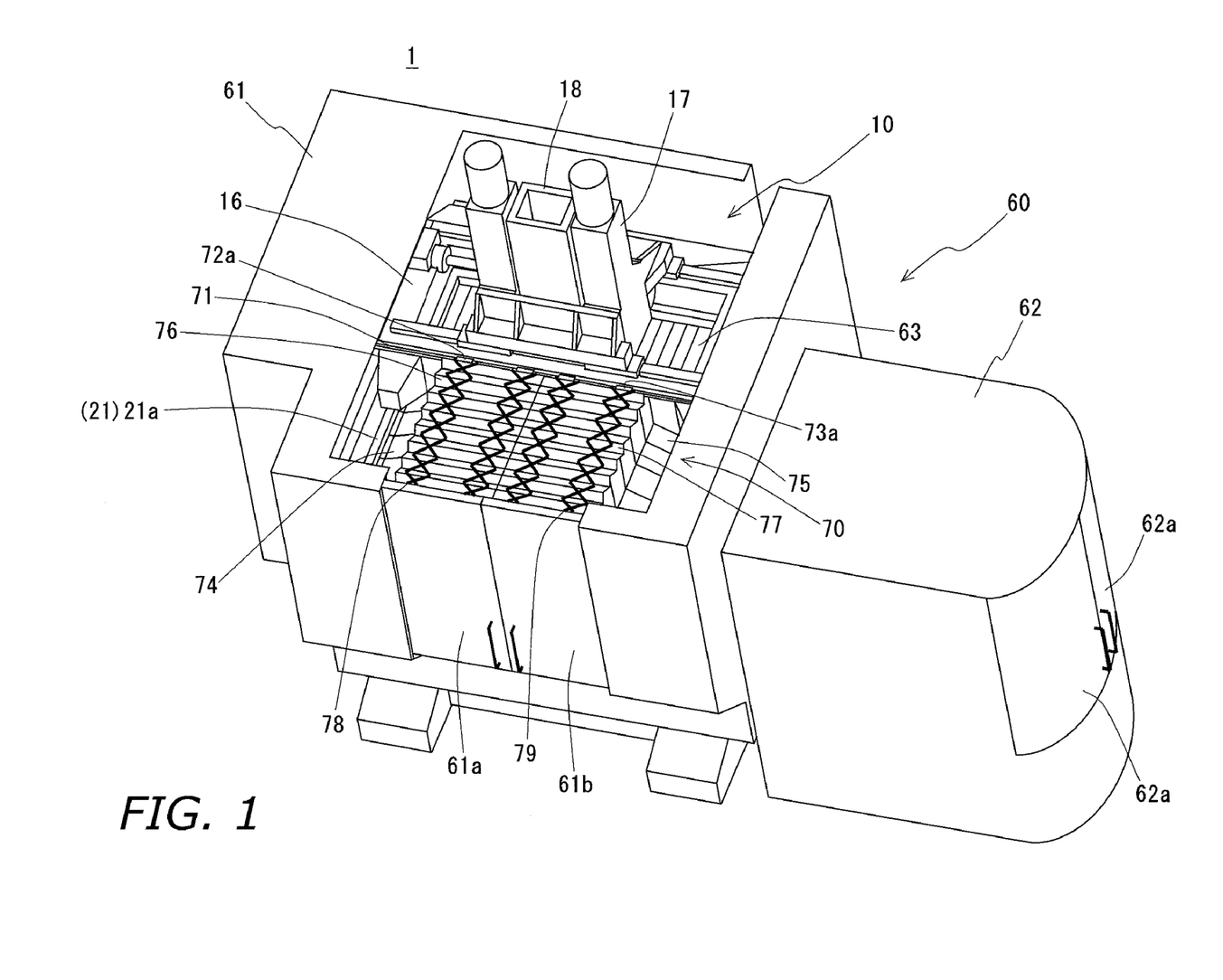
FIG. 1 is an oblique schematic view of a machine tool according to a preferred embodiment of the invention.
Figure 2:
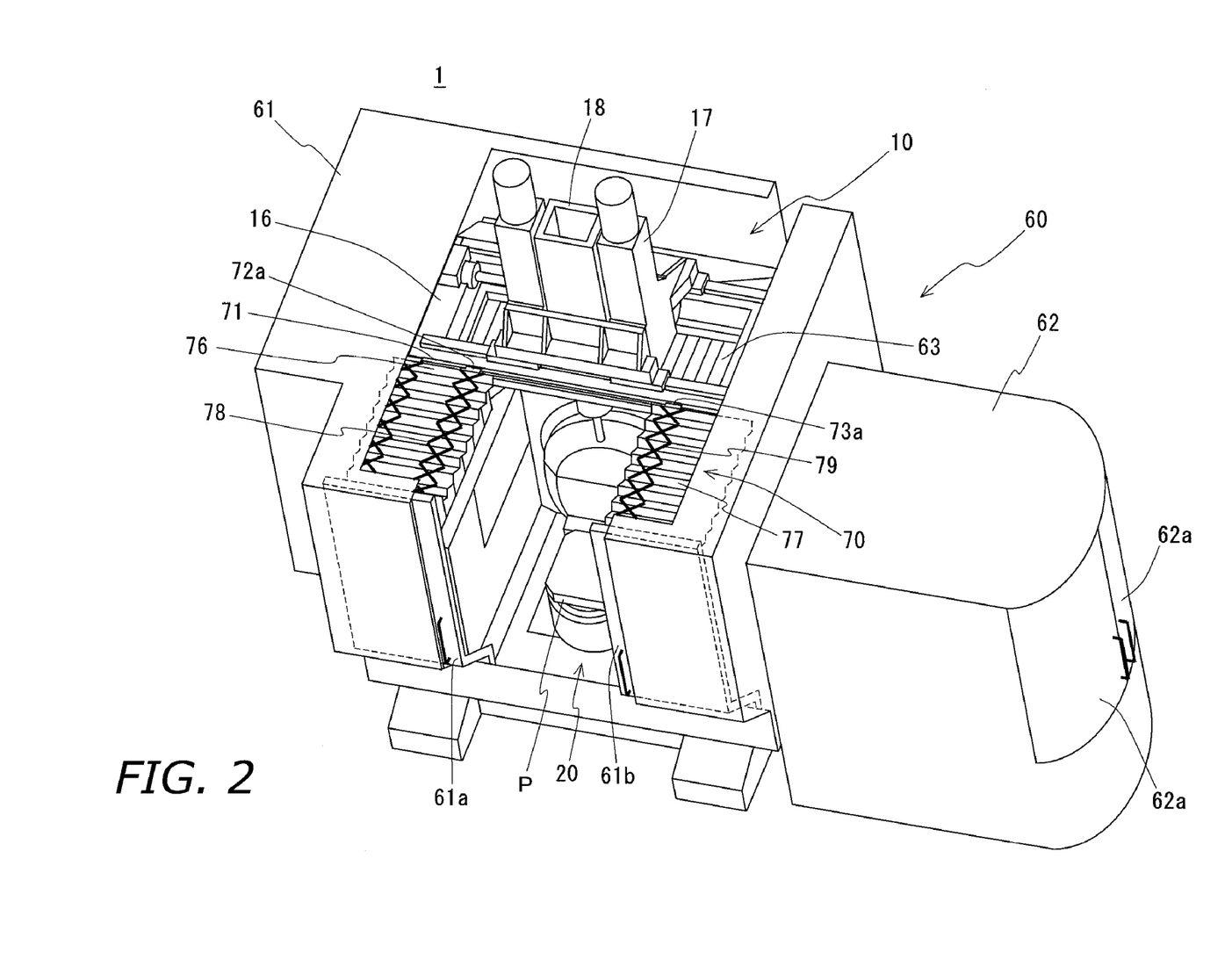
FIG. 2 is an oblique schematic view of a machine tool according to a preferred embodiment of the invention.
Figure 3:
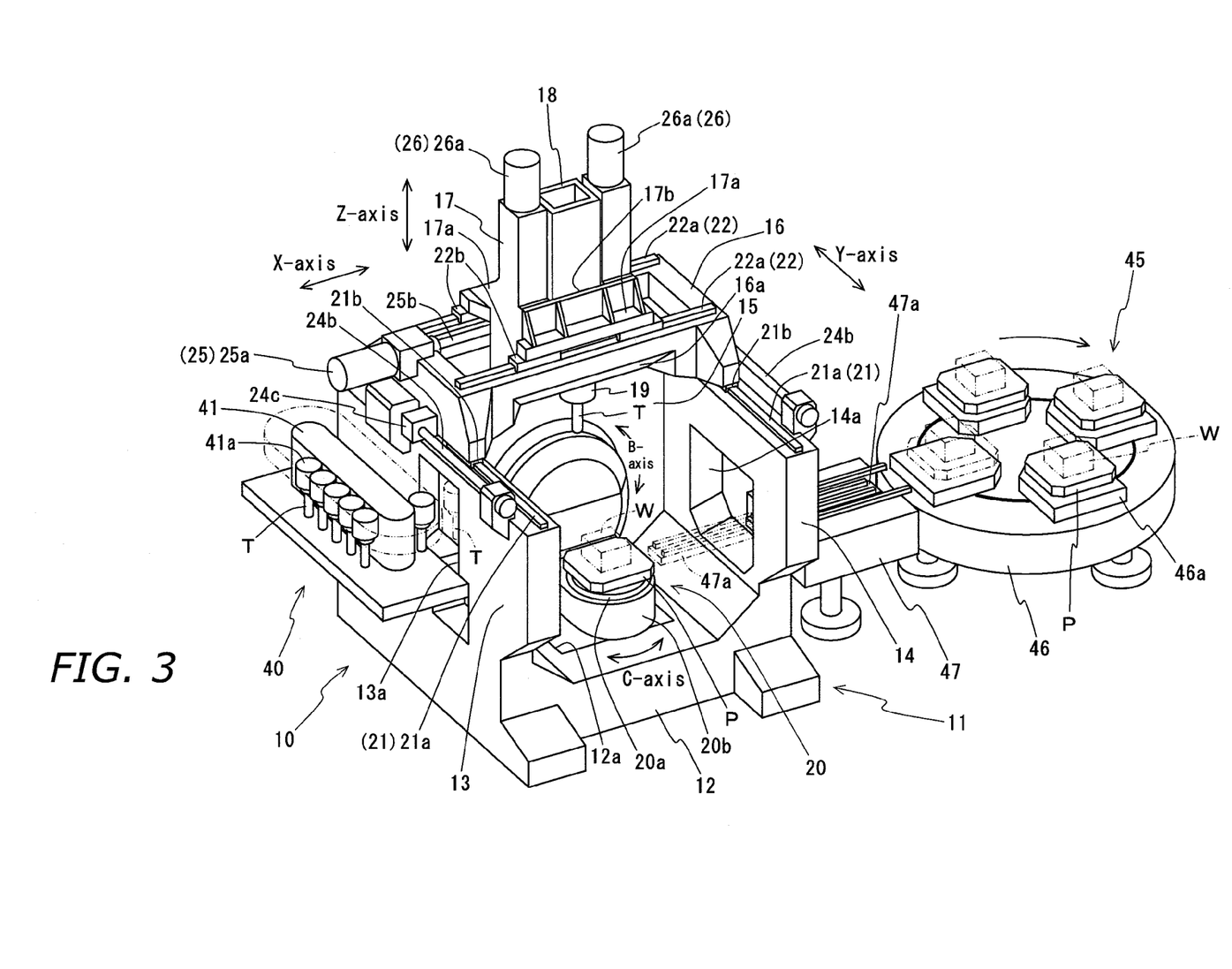
FIG. 3 is an oblique schematic view showing the machine tool, a tool changing device, and a pallet changing device according to a preferred embodiment of the invention.
Figure 4:
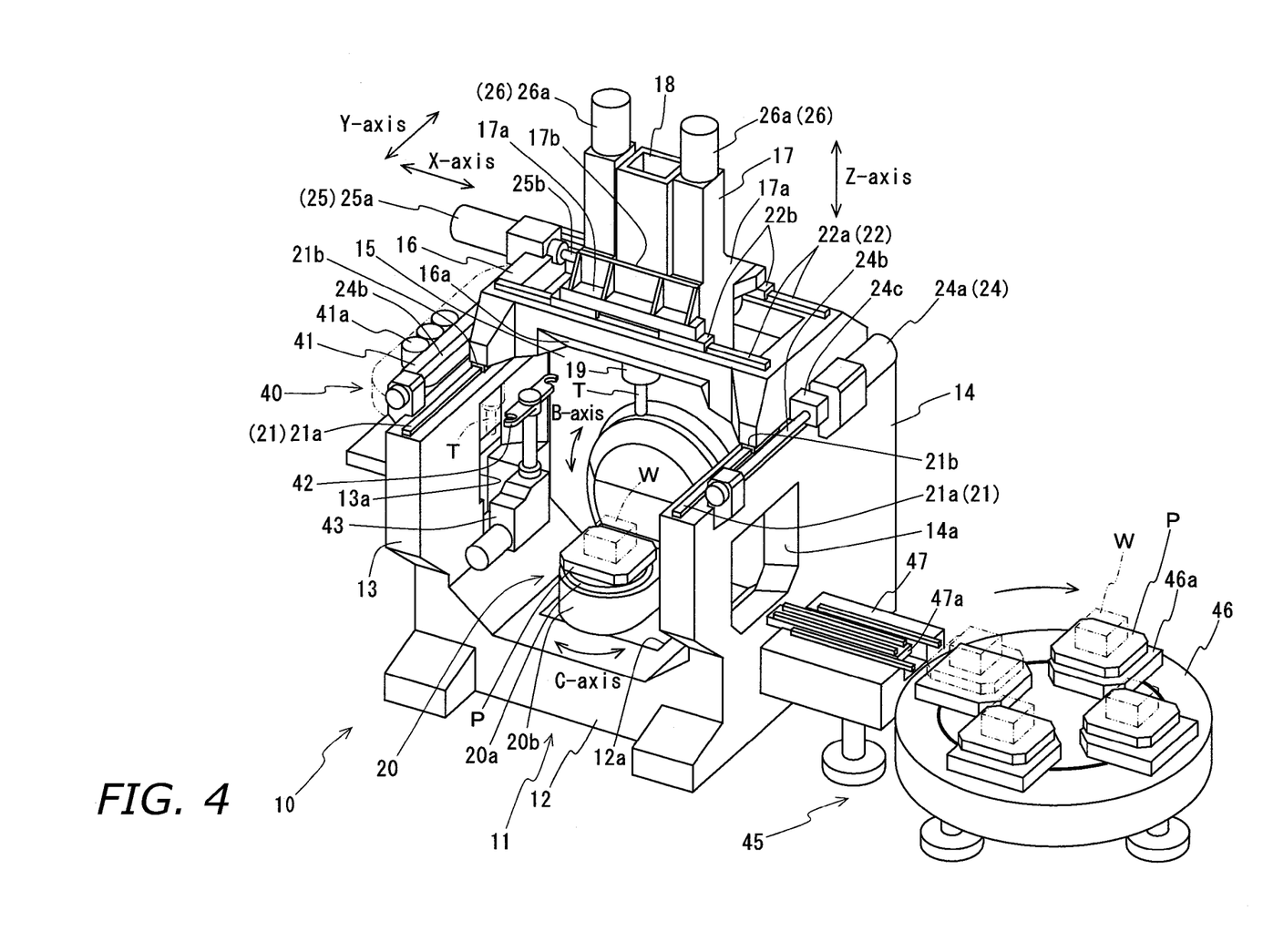
FIG. 4 is an oblique schematic view showing the machine tool, a tool changing device, and a pallet changing device according to a preferred embodiment of the invention.
Figure 5:
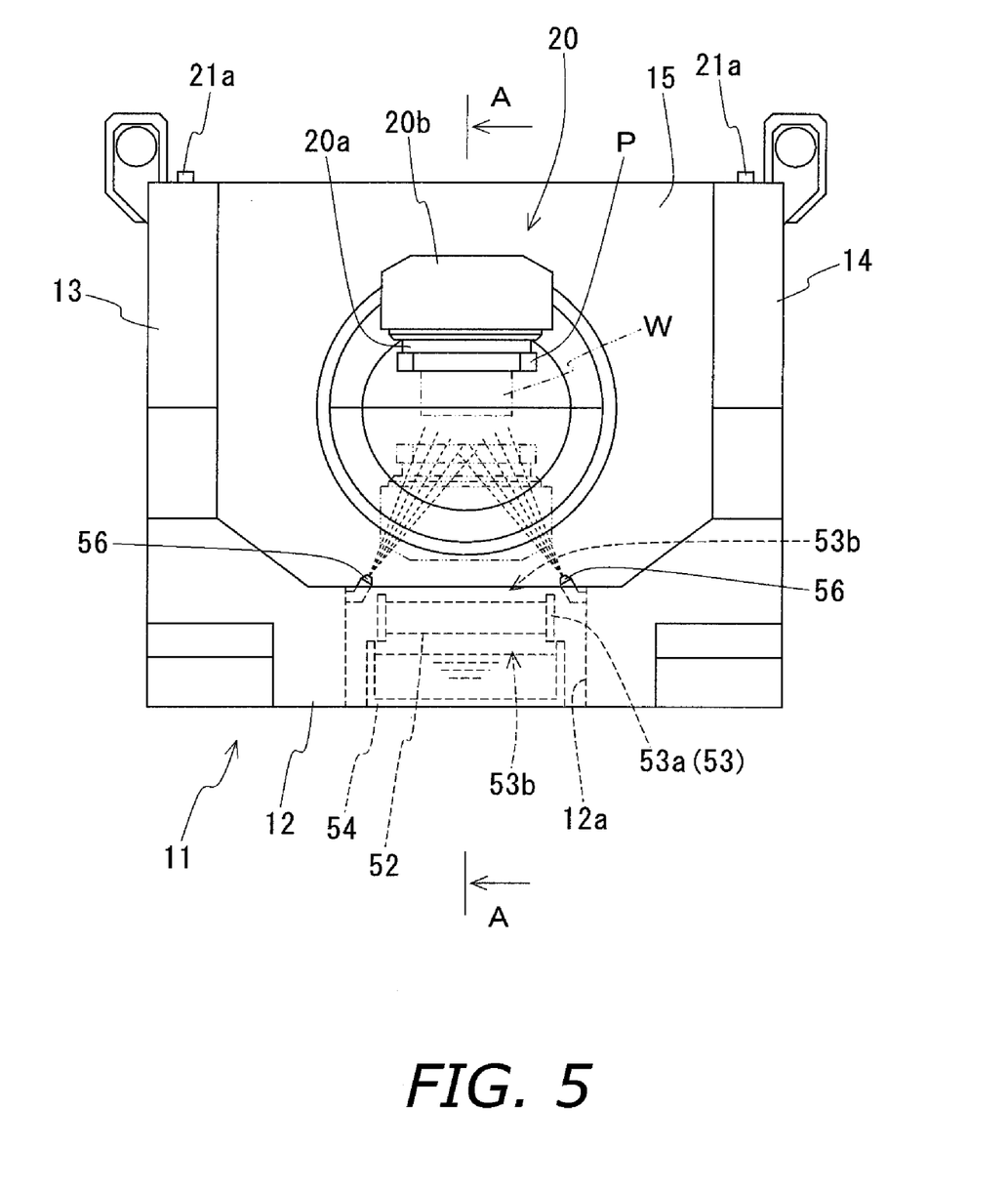
FIG. 5 is a front view showing a part of a machine tool according to a preferred embodiment of the invention.
Figure 6:
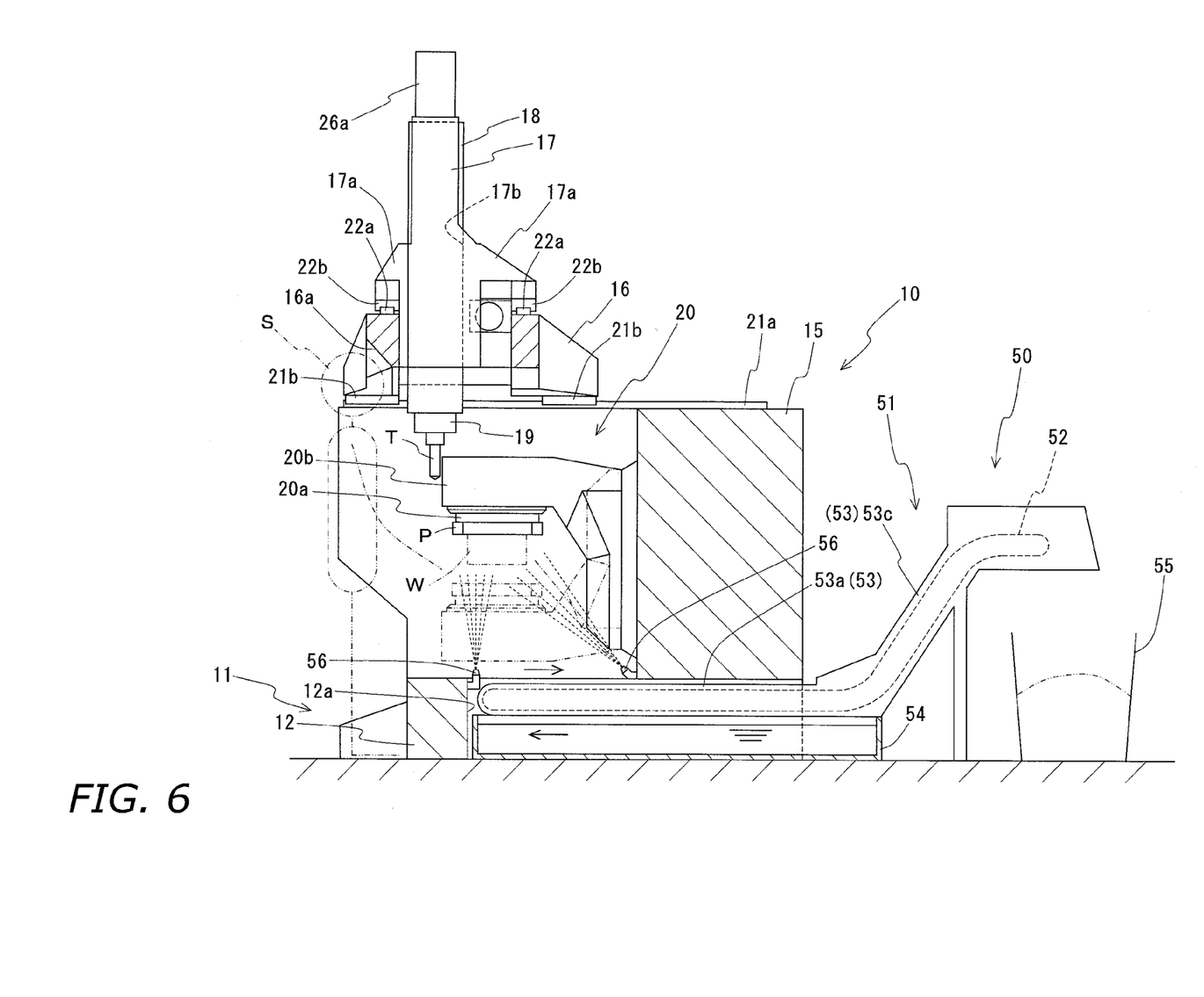
FIG. 6 is a section view through line A-A in FIG. 5.
Figure 7:
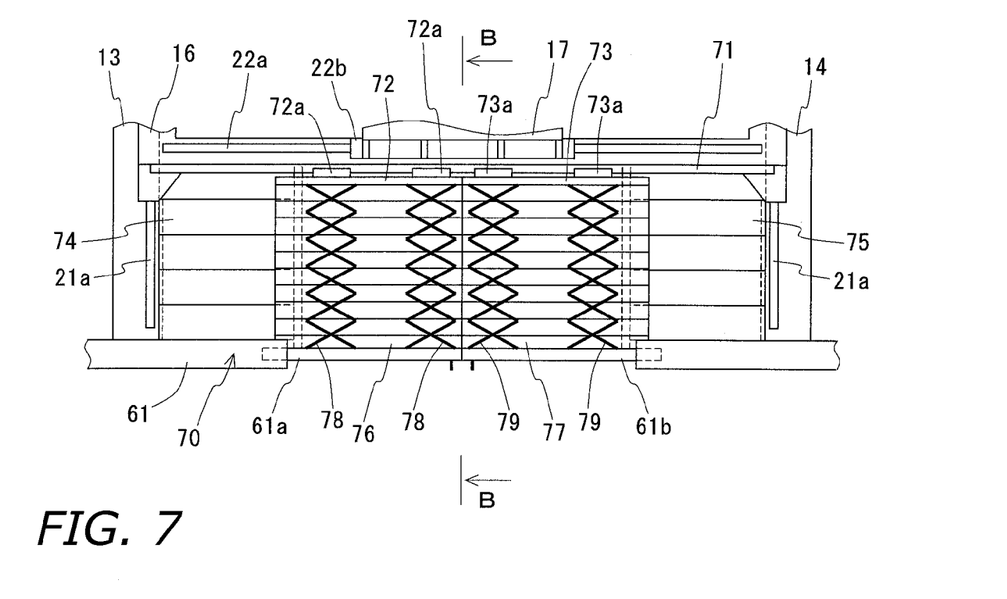
FIG. 7 is a plan view showing a part of the top cover in a preferred embodiment of the invention.
Figure 8:
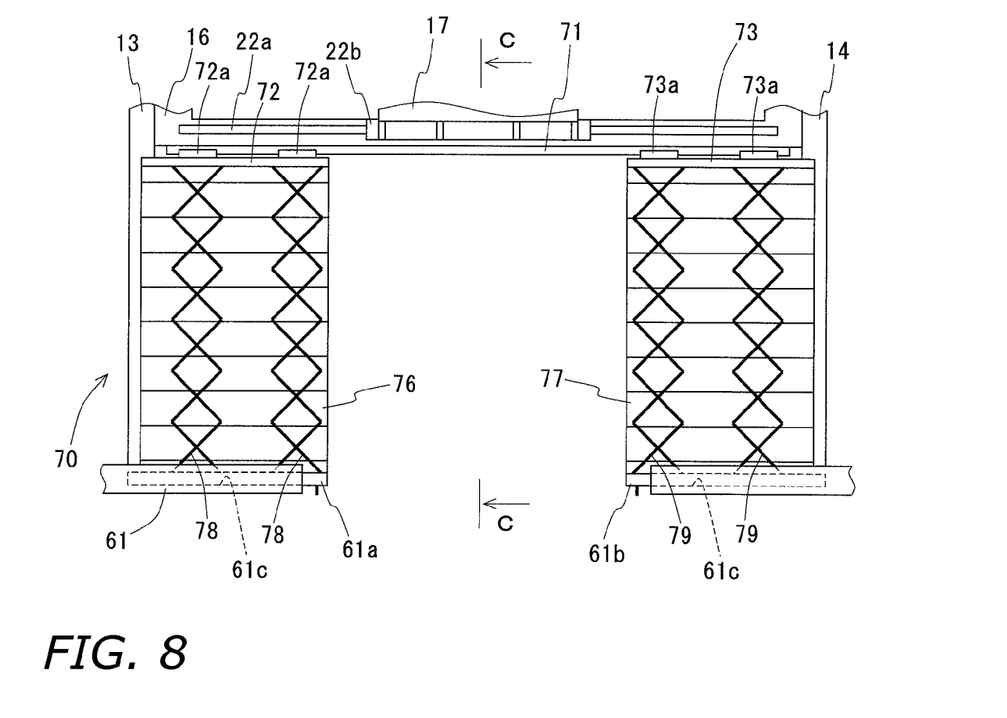
FIG. 8 is a plan view showing a part of the top cover in a preferred embodiment of the invention.
Figure 9:
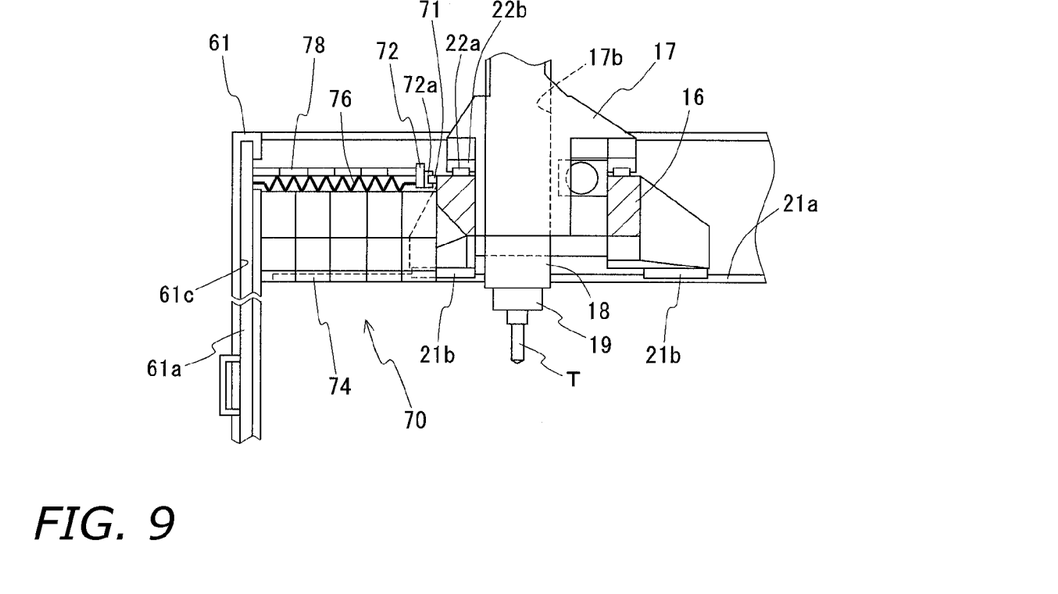
FIG. 9 is a section view through line B-B in FIG. 7.
Figure 10:
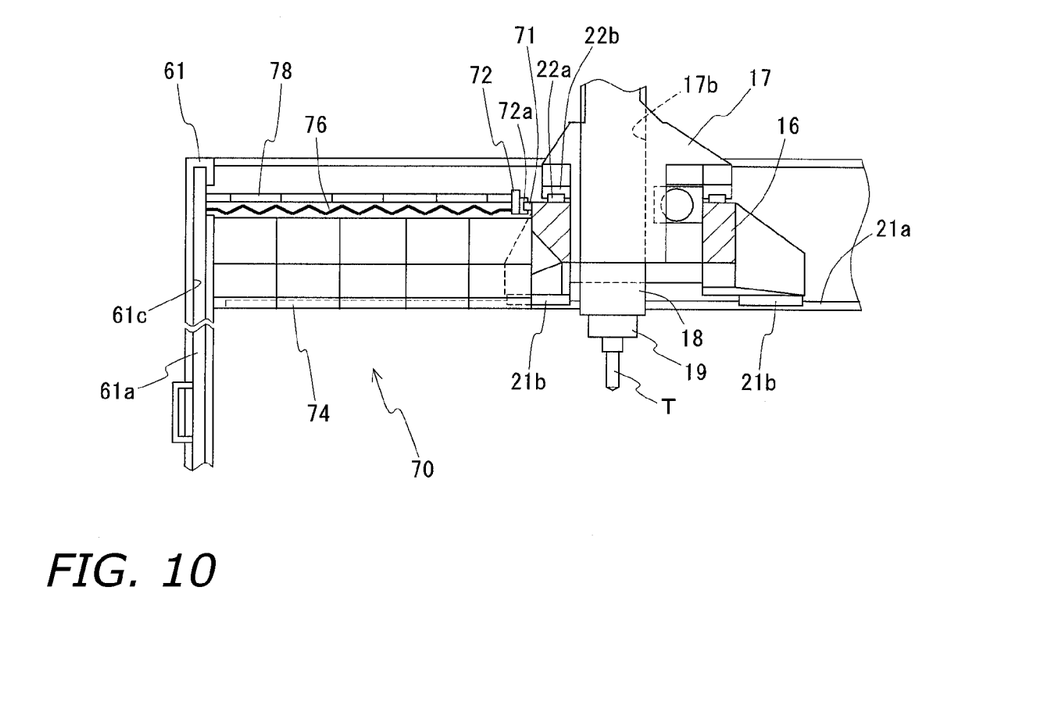
FIG. 10 is a section view through line C-C in FIG. 8.

A preferred embodiment of the invention is described below with reference to the accompanying figures wherein FIG. 1 and FIG. 2 are oblique schematic views of a machine tool according to a preferred embodiment of the invention, and FIG. 3 and FIG. 4 are oblique schematic views showing the machine tool, a tool changing device, and a pallet changing device according to this preferred embodiment of the invention. FIG. 5 is a front view showing a part of a machine tool according to this preferred embodiment of the invention, and FIG. 6 is a section view through line A-A in FIG. 5. FIG. 7 and FIG. 8 are plan views showing a part of the top cover in this preferred embodiment of the invention, FIG. 9 is a section view through line B-B in FIG. 7, and FIG. 10 is a section view through line C-C in FIG. 8.

As shown in FIG. 1 to FIG. 6, a machine tool 1 according to this embodiment of the invention has a machine tool unit 10 of a type known as a vertical machining center, a tool changing device 40, pallet changing device 45, and a waste recovery device 50 attached to the machine tool unit 10, and a cover 60 covering at least the machine tool unit 10, tool changing device 40, and pallet changing device 45.

The machine tool unit 10 comprises a bed 11, a first saddle 16 that is disposed to the bed 11 and moves freely in a horizontal plane in the front-rear direction (along the Y-axis), a second saddle 17 that is disposed to the first saddle 16 and moves freely in a horizontal plane side to side (along the X-axis), a spindle head 18 that is disposed to the second saddle 17 and moves freely vertically (along the Z-axis), a main spindle 19 that holds a tool T and is supported by the spindle head 18 to rotate freely on the main spindle axis, and a table 20 on which a pallet P is mounted. Work W is fixed on top of the pallet P. The table 20 is disposed to the bed 11 and can swivel freely on an axis of rotation (B-axis) parallel to the Y-axis and rotate freely an axis of rotation (C axis) perpendicular to the top surface of the pallet P.

The machine tool unit 10 also comprises a Y-axis guide mechanism 21 for guiding movement of the first saddle 16 along the Y-axis, a X-axis guide mechanism 22 for guiding movement of the second saddle 17 along the X-axis, a Z-axis guide mechanism (not shown in the figures) for guiding movement of the spindle head 18 along the Z-axis, a Y-axis feed mechanism 24 for moving the first saddle 16 along the Y-axis, an X-axis feed mechanism 25 for moving the second saddle 17 along the X-axis, a Z-axis feed mechanism 26 for moving the spindle head 18 along the Z-axis, a main spindle rotational drive mechanism (not shown in the figures) for rotating the main spindle 19 on its axis, a first table rotation drive mechanism (not shown in the figures) for swiveling the table 20 on the B-axis for indexing to a specific rotational angle position, and a second table rotation drive mechanism (not shown in the figures) for rotating the table 20 on the C axis for indexing to a specific rotational angle position.

The bed 11 comprises with a rectangular base when seen in plan view, left and right sidewalls 13 and 14 (left sidewall 13 on the front left side and right sidewall 14 on the front right side) disposed vertically on both sides of the base 12 across an interval therebetween on the X-axis, and a sidewall 15 (rear sidewall) disposed vertically to the base 12 at the back between the right and left sidewalls 13 and 14.

The base 12 has a waste removal hole 12a of which one end opens to the top center portion of the base 12 and the other end opens to the back outside surface of the base 12. The top of the base 12 and the base portion of the left sidewall 13 and the base portion of the right sidewall 14 decline into the opening to the waste removal hole 12a.

A tool changing opening 13a is formed through from the outside to the inside of the left sidewall 13 so that a tool T can be delivered into and removed from the inside of the machine tool unit 10 (the space enclosed by sidewalls 13, 14, 15) when the tool changing device 40 changes the tool T. A pallet changing opening 14a is formed through from the outside to the inside of the right sidewall 14 so that a pallet P can be delivered into and removed from the inside of the machine tool unit 10 (the space enclosed by sidewalls 13, 14, 15) when the pallet changing device 45 changes the pallet P.

The table 20 comprises a pallet mounting unit 20a on which a pallet P is mounted, and a support unit 20b which is supported on the inside of the rear sidewall 15 of the bed 11 to swivel freely on the B-axis and supports the pallet mounting unit 20a to rotate freely on the C axis. The table 20 is located in the space enclosed by the sidewalls 13, 14, 15 so that the pallet P mounted on the pallet mounting unit 20a is substantially positioned above the waste removal hole 12a, and there is a constant gap between the bottom of the support unit 20b and the top of the base 12.

The pallet mounting unit 20a is rotated on the C axis by the second table rotation drive mechanism (not shown in the figures) and indexed to a specific rotational angle position, and the support unit 20b is swiveled on the B-axis by the first table rotation drive mechanism (not shown in the figures) and indexed to a specific rotational angle position. The work W on the pallet P can thus be indexed to a desired angular position by rotating the support unit 20b on the B-axis to swivel the pallet P on the B-axis, and by rotating the pallet P with the pallet mounting unit 20a on the C axis.

A pallet P on the pallet mounting unit 20a can be swiveled both to the right and to the left on the B-axis by the first table rotation drive mechanism (not shown in the figures) to any position on the B-axis between a position where the top of the pallet P is horizontal and facing up (with the pallet P at a swivel angle of 0 degrees) to a position where the top of the pallet P is horizontal and facing down (with the pallet P at a swivel angle of 180 degrees).

The first saddle 16 has a rectangular frame shape with the transverse side parallel to the X-axis and the longitudinal side parallel to the Y-axis. The end portions of the long transverse sides are supported to move freely along the Y-axis on the top of the left sidewall 13 and right sidewall 14 of the bed 11. A recess 16a is formed in the front outside surface between both ends of the long side of the first saddle 16. As shown in FIG. 6, when the first saddle 16 moves toward the front of the bed 11, the recess 16a prevents the front outside surface of the first saddle 16 from striking a worker S working at the front side of the bed 11.

The second saddle 17 comprises a shoulder 17a extending to each side in the Y-axis direction, and a through-hole 17b passing vertically through the second saddle 17. The second saddle 17 is disposed within the frame of the first saddle 16 with the shoulders 17a supported by the top of the transverse portions of the first saddle 16 so that the second saddle 17 can move freely on the X-axis.

The spindle head 18 is supported to move freely on the Z-axis inside the through-hole 17b in the second saddle 17. The main spindle 19 is disposed above the table 20 with the main spindle axis parallel to the Z-axis and the main spindle 19 freely rotatably supported by the bottom portion of the spindle head 18.

The Y-axis guide mechanism 21 comprises guide rails 21a aligned with the Y-axis on the top of the left sidewall 13 and right sidewall 14 of the bed 11, and sliders 21b that are affixed to the bottom of both long end parts of the first saddle 16 and engage and move freely on the guide rails 21a.

The Y-axis feed mechanism 24 comprises drive motors 24a disposed on the top of left sidewall 13 and right sidewall 14 of the bed 11, ball screws 24b, and nuts 24c. The ball screws 24b are disposed aligned with the Y-axis on the top of the left sidewall 13 and right sidewall 14 of the bed 11, and are axially rotated by the corresponding drive motors 24a. The nuts 24c are affixed to the outside surfaces of the longitudinal portions of the first saddle 16, and screw onto the matching ball screws 24b.

When the drive motors 24a of this Y-axis feed mechanism 24 are driven and the ball screws 24b thus turn axially, the nuts 24c move along the ball screws 24b and the first saddle 16 thus moves on the Y-axis guided by the guide rails 21a and sliders 21b of the Y-axis guide mechanism 21.

The X-axis guide mechanism 22 comprises guide rails 22a disposed aligned with the X-axis on the top of the transverse side portions of the first saddle 16, and sliders 22b that are affixed to the bottoms of the shoulders 17a of the second saddle 17 and engage and move freely on the guide rails 22a.

The X-axis feed mechanism 25 comprises a drive motor 25a disposed to one longitudinal side portion of the of the first saddle 16, a ball screw 25b that is disposed on the X-axis inside the frame of the first saddle 16 and is axially rotated by the drive motor 25a, and a nut (not shown in the figures) that is affixed to the second saddle 17 and screws onto the ball screw 25b.

When the drive motor 25a of this X-axis feed mechanism 25 is driven and the ball screw 25b turns axially, the nut moves along the ball screw 25b and the second saddle 17 thus moves along the X-axis guided by the guide rails 22a and sliders 22b of the X-axis guide mechanism 22.

The Z-axis guide mechanism (not shown in the figures) comprises guide rails (not shown in the figures) aligned with the Z-axis on the inside of both X-axis sides of the through-hole 17b of the second saddle 17, and sliders (not shown in the figures) that are affixed to the outside of both X-axis sides of the spindle head 18 and engage and move freely on these guide rails (not shown in the figures).

The Z-axis feed mechanism 26 comprises drive motors 26a disposed on the top of both X-axis sides of the second saddle 17, ball screws (not shown in the figures) that are disposed aligned with the Z-axis on the inside of both X-axis sides of the second saddle 17 and are axially rotated by the drive motors 26a, and nuts (not shown in the figures) that are affixed to the outside of both X-axis sides of the spindle head 18 and screw onto the ball screws (not shown in the figures).

When the drive motors 26a of this Z-axis feed mechanism 26 are driven and the ball screws (not shown in the figures) turn axially, the nuts (not shown in the figures) move along the ball screws so that the spindle head 18 moves on the Z-axis guided by the guide rails (not shown in the figures) and sliders (not shown in the figures) of the Z-axis guide mechanism (not shown in the figures).

The tool changing device 40 comprises a tool magazine 41, a tool changing arm 42, and a drive mechanism unit 43. The tool magazine 41 is supported on the outside of the left sidewall 13 of the bed 11, and has a plurality of holding units 41a each holding a tool T. The tool changing arm 42 swivels horizontally, grips the tool T held in the main spindle 19 on one end, and is inserted from the tool magazine 41 through the tool changing opening 13a in the left sidewall 13 to the inside of the machine tool unit 10 to grip the (next) tool T positioned at a predetermined position with the other end. The drive mechanism unit 43 is supported on the inside surface of the left sidewall 13 and supports the tool changing arm 42, and causes the tool changing arm 42 to rotate horizontally and move vertically.

The tool changing device 40 replaces the tool T on the main spindle 19 with the next tool T set to a predetermined position (indicated by the imaginary line in FIG. 3 and FIG. 4) as a result of the horizontal rotation and vertical movement of the tool changing arm 42 driven by the drive mechanism unit 43, and introduces and removes the tools T through the tool changing opening 13a in the left sidewall 13.

The pallet changing device 45 has pallet moving table 46 and a pallet moving mechanism 47. The pallet moving table 46 has a plurality of pallet tables 46a on top of which the pallets P are placed, and rotates the pallet tables 46a on a vertical axis of rotation in the direction of the arrows shown in FIG. 3 and FIG. 4. The pallet moving mechanism 47 is located between the machine tool unit 10 and the pallet moving table 46, and moves a pallet P between the pallet table 46a rotated to a predetermined position by the pallet moving table 46 and the table 20 inside the machine tool unit 10.

The pallet moving mechanism 47 has a conveyance member 47a that can move to and away from the table 20 through the pallet changing opening 14a in the right sidewall 14 of the bed 11. When moving a pallet P, the conveyance member 47a moves to the table 20 to place or remove a pallet P on the table 20 through the pallet changing opening 14a, and thus replaces the pallet P carrying the processed work W on the table 20 with a new pallet P carrying unprocessed work W.

Loading and unloading work W on a pallet P is done by a worker, for example, after the pallet moving table 46 has rotated the pallet table 46a (pallet P) to a predetermined rotational position where the processed work W is removed from the pallet P and an unprocessed work W is mounted on the pallet P.

The waste recovery device 50 comprises a discharge mechanism 51, a storage tank 54, a collection box 55, a nozzles 56, and a supply pump (not shown in the figures).

The discharge mechanism 51 conveys cutting waste resulting from processing the work W in a specific transportation direction and removes the waste from the machine tool unit 10. The storage tank 54 is disposed below the discharge mechanism 51 on the upstream side in the waste transportation direction, and stores the cutting fluid. The collection box 55 is disposed below the discharge mechanism 51 at the downstream end of the transportation direction. A plurality of nozzles 56 are disposed inside the waste removal hole 12a at the top of the opening in the base 12, and on the rear sidewall 15 at the top of the waste removal hole 12a in the base 12. The supply pump (not shown in the figures) supplies cutting fluid from the storage tank 54 to the plural nozzles 56 for discharge to the work W.

The discharge mechanism 51 comprises a conveyor belt 52 composed of a plurality of plates connected in an endless loop for carrying cutting waste to the collection box 55, and a support unit 53 that houses and enables the conveyor belt 52 to move freely in a loop. The support unit 53 has a horizontal portion 53a disposed inside the waste removal hole 12a, and an incline portion 53c disposed outside the machine tool 1. The discharge mechanism 51 also has a drive motor (not shown in the figures) that causes the conveyor belt 52 to move in the direction of the arrows shown in FIG. 6.

The horizontal portion 53a of the support unit 53 is open on the top and bottom. Waste and cutting fluid drop from this open portion 53b onto the conveyor belt 52, and cutting fluid that drops onto the conveyor belt 52 flows down through this open portion 53b into the storage tank 54 as further described below. The bottom of the downstream end part of the incline portion 53c of the support unit 53 is open, and waste conveyed by the conveyor belt 52 drops through this opening (not shown in the figures) into the collection box 55 below.

The storage tank 54 is located below the horizontal portion 53a of the support unit 53 and collects the cutting fluid that drops from the conveyor belt 52.

The nozzles 56 are arranged to discharge cutting fluid supplied by the supply pump (not shown in the figures) through supply tubes not shown upward toward the pallet P on the table 20, which has been swiveled 180 degrees on the B-axis to the upside down position by the first table rotation drive mechanism (not shown in the figures).

With this waste recovery device 50, waste and cutting fluid are guided into the waste removal hole 12a by the inclined top of the base 12, the inclined based portions where the left sidewall 13 and right sidewall 14 meet the base 12, and covers not shown disposed appropriately in the space enclosed by the sidewalls 13, 14, 15, and drop from this waste removal hole 12a onto the conveyor belt 52, which is driven in a circle by a drive motor (not shown in the figures). The cutting waste is then conveyed outside the machining center by the conveyor belt 52, falls into the collection box 55 located below the downstream end of the conveyor belt 52, and is recovered. The cutting fluid drops from the conveyor belt 52 and is collected in the storage tank 54.

As shown in FIG. 5 and FIG. 6, the support unit 20b of the table 20 is swiveled 180 degrees on the B-axis by the first table rotation drive mechanism (not shown in the figures) so that the support unit 20b and the work W on the pallet P attached to the pallet mounting unit 20a are upside down. Cutting fluid is then supplied from the supply pump (not shown in the figures) and discharged from the nozzles 56 to remove any cutting waste left on the support unit 20b, the pallet mounting unit 20a, the pallet P, and the work W, for example. The waste thus removed drops onto the conveyor belt 52 from the waste removal hole 12a, and is conveyed outside the machine tool unit 10 and recovered.

The cover 60 includes a first cover 61 covering the outside of the machine tool unit 10 and the tool changing device 40; a second cover 62 that is connected to the first cover 61 and covers the pallet changing device 45; a top cover 70 that is connected to the first cover 61 and covers the top of the opening enclosed by the sidewalls 13, 14, 15 of the bed 11; a telescopic third cover 63 that is rendered inside the frame of the first saddle 16 of the machine tool unit 10 to enable movement of the second saddle 17 on the X-axis; a tool changer door for closing the tool changing opening 13a in the left sidewall 13 of the bed 11; and a pallet changer door (not shown in the figures) for closing the pallet changing opening 14a in the right sidewall 14 of the bed 11.

The tool changer door (not shown in the figures) can be opened as needed during the tool changing operation of the tool changing device 40, and the pallet changer door (not shown in the figures) can be opened as needed during the pallet changing operation of the pallet changing device 45.

The first cover 61 comprises a left door 61a that opens by sliding to the left sidewall 13 of the bed 11 at the front of the machine tool unit 10, and a right door 61b that slides to the right sidewall 15 to open. The opened doors 61a and 61b are housed in pockets 61c rendered in the front of the first cover 61.

The second cover 62 comprises doors 62a that slide to the right and left to open similarly to the first cover 61. Work W can be placed on and removed from the pallets P on the pallet moving table 46 of the pallet changing device 45 through the opening afforded by these doors 62a.

The top cover 70 comprises a guide rail 71 disposed on the front top portion of the first saddle 16 and aligned with the X-axis; a left moving member 72 and right moving member 73 having sliders 72a and 73a that engage and move freely on the guide rail 71; a first left top cover 74 and a first right top cover 75 disposed below the guide rail 71; a second left top cover 76 and a second right top cover 77 disposed above the first top covers 74 and 75 with the front and back end parts of the covers 76 and 77 connected to the top inside surface of the doors 61a and 61b of the first cover 61 and the moving members 72 and 73; and a left linkage member 78 and a right linkage member 79 disposed above the second top covers 76 and 77 with the end parts connected to the top inside of the doors 61a and 61b of the first cover 61 and the moving members 72 and 73.

The first top covers 74 and 75 are telescopic covers that enable movement of the first saddle 16 on the Y-axis. The first left top cover 74 is installed with the bottom part attached to the top of the left sidewall 13 of the bed 11 inside of the guide rails 21a of the Y-axis guide mechanism 21, the back part below the guide rail 71 at the front left end part of the long side of the first saddle 16, and the front part attached to the top inside part of the first cover 61. The first right top cover 75 is installed with the bottom part attached to the top of the right sidewall 14 of the bed 11 inside of the guide rails 21a of the Y-axis guide mechanism 21, the back part below the guide rail 71 at the front right end part of the long side of the first saddle 16, and the front part attached to the top inside part of the first cover 61.

The first top covers 74 and 75 do not cover the Y-axis guide mechanism 21 and Y-axis feed mechanism 24 because the bottom part of the covers is disposed inside of the guide rails 21a at the top of the sidewalls 13 and 14 of the bed 11.

The second top covers 76 and 77 are bellows-like covers enabling movement of the first saddle 16 on the Y-axis. The front part of the second left top cover 76 is attached to the top inside part of the left door 61a, and the back part is attached to the left moving member 72. The front part of the second right top cover 77 is attached to the top inside part of the right door 61b, and the back part is attached to the right moving member 73.

The linkage members 78 and 79 comprise a pantograph mechanism enabling movement of the first saddle 16 on the Y-axis, and two linkage members are disposed to each of the second top covers 76 and 77. The ends of the left linkage member 78 are affixed to the top inside part of the left door 61a and the left moving member 72, and the ends of the right linkage member 79 are affixed to the top inside part of the right door 61b and right moving member 73.

The first cover 61, third cover 63, top cover 70, tool changer door (not shown in the figures), and pallet changer door (not shown in the figures) of the cover 60, and the covers (not shown in the figures) appropriately disposed to the inside of the sidewalls 13, 14, 15 of the bed 11, close the space (machining area) contained within the sidewalls 13, 14, 15, and prevent waste and cutting fluid from flying outside.

When the doors 61a and 61b of the first cover 61 open and close as shown in FIG. 1, FIG. 2, FIG. 7, and FIG. 8, the second top covers 76 and 77 are guided by the guide rail 71 and sliders 72a and 73a and move on the X-axis together with the linkage members 78 and 79 and moving members 72 and 73. As a result, opening and closing the doors 61a and 61b opens and closes the top part of the working area.

With the machine tool 1 according to this embodiment of the invention the first saddle 16 is guided by the Y-axis guide mechanism 21 and moved along the Y-axis by the Y-axis feed mechanism 24, the second saddle 17 is guided by the X-axis guide mechanism 22 and moved along the X-axis by the X-axis feed mechanism 25, the spindle head 18 is guided by the Z-axis guide mechanism (not shown in the figures) and moved along the Z-axis by the Z-axis feed mechanism 26, and the main spindle 19 is driven rotationally on its axis by the main spindle rotation drive mechanism (not shown in the figures), and the work W held on the pallet P placed on the table 20 is thus machined by the tool T held on the main spindle 19.

Waste produced by machining and cutting fluid supplied appropriately to where the tool T and work W contact drop from the waste removal hole 12a onto the conveyor belt 52. The waste is conveyed by the conveyor belt 52 and recovered in the collection box 55, and the cutting fluid flows down and off the conveyor belt 52 into the storage tank 54 located below the conveyor belt 52.

The pallet mounting unit 20a of the table 20 is rotated on the C axis and indexed to a predetermined rotational angle position by the second table rotation drive mechanism (not shown in the figures), and the support unit 20b of the table 20 is swiveled on the B-axis by the first table rotation drive mechanism (not shown in the figures) and indexed to a predetermined rotational angle position, to index the pallet P (the work W on the pallet P) to a specific rotational angle position on the C axis and a specific rotational angle position on the B-axis for processing. The tool changing device 40 also changes the tool T as needed through the tool changing opening 13a in the left sidewall 13 of the bed 11.

When the machining process is completed, the first table rotation drive mechanism (not shown in the figures) swivels the support unit 20b of the table 20 on the B-axis to turn the work W on the pallet P upside down, and cutting fluid is then discharged from the nozzles 56 to remove any waste from the support unit 20b, the pallet mounting unit 20a, the pallet P, or the work W, for example. The removed waste drops through the waste removal hole 12a onto the conveyor belt 52 whereby the waste is conveyed out from the working area and recovered into the collection box 55.

The first table rotation drive mechanism (not shown in the figures) then again swivels the support unit 20b of the table 20 on the B-axis to the upright horizontal position, and the pallet changing device 45 changes the pallet P through the pallet changing opening 14a in the right sidewall 14 of the bed 11.

In a machine tool 1 according to this embodiment of the invention the table 20 is disposed inside the space enclosed by the three sidewalls 13, 14, 15 of the bed 11, both ends of the long sides of the first saddle 16 are supported on top of the right and left sidewalls 13 and 14 to move freely on the Y-axis, the second saddle 17 is disposed movably on the X-axis inside the frame of the first saddle 16, and the spindle head 18 is disposed movably on the Z-axis inside the through-hole 17b of the second saddle 17. As a result, the first saddle 16, the second saddle 17, and the spindle head 18 can also be disposed above the top of the table 20.

A machine tool 1 according to this embodiment of the invention makes it more difficult for cutting waste and cutting fluid to enter the Y-axis feed mechanism 24 and Y-axis guide mechanism 21, the X-axis feed mechanism 25 and X-axis guide mechanism 22, and the Z-axis feed mechanism 26 and Z-axis guide mechanism (not shown in the figures) when compared with a prior art machine tool in which the feed mechanism for moving the table and the guide mechanism for guiding table movement are disposed below the top of the table. Waste and cutting fluid can therefore be prevented from entering the Y-axis, X-axis, and Z-axis feed mechanisms 24, 25, 26 and the Y-axis, X-axis, and Z-axis guide mechanisms 21 and 22 using only the top cover 70 and third cover 63, and separate covers for the Y-axis, X-axis, and Z-axis feed mechanisms 24, 25, 26 and the Y-axis, X-axis, and Z-axis guide mechanisms 21 and 22 are not needed. As a result, the parts count and the manufacturing cost of the cover 60 can be reduced, and maintenance of the cover 60 can be simplified.

The first saddle 16 is also rendered with a rectangular frame shape, the second saddle 17 is disposed inside the frame of the first saddle 16, and the spindle head 18 is disposed inside a through-hole 17b formed vertically through the second saddle 17. Unlike the prior art machine tool, the saddle therefore does not project from the front and a support structure for the spindle head is not needed. Deflection and other deformation of the bed 11, first saddle 16, and second saddle 17 are thus prevented, and work W can be machined with high precision.

Play and a change in attitude can also be prevented when moving the first saddle 16 and spindle head 18, and high precision machining is thus afforded, by driving both long-end portions of the first saddle 16 by means of a Y-axis feed mechanism 24 comprising two drive motors 24a, ball screws 24b, and nuts 24c, and driving both ends of the spindle head 18 by means of a Z-axis feed mechanism 26 comprising two drive motors 26a, ball screws (not shown in the figures), and nuts (not shown in the figures).

Yet further, by rendering a recess 16a at the front outside surface between the ends of the long sides of the first saddle 16, the front outside surface of the first saddle 16 can be prevented from striking a worker S working at the front of the bed 11 when the first saddle 16 moves to the front side of the bed 11.

A pallet P on the table 20 can be swiveled and indexed on the B-axis by means of a first table rotation drive mechanism (not shown in the figures) and can also be rotated and indexed on the C axis by means of a second table rotation drive mechanism (not shown in the figures). The work W (pallet P) therefore needs to be mounted on the table 20 only once in order to complete a processing sequence, including machining the outside of the work W, thus improving efficiency and machining precision.

The tool changing device 40 and pallet changing device 45 also enable more efficient tool changing and pallet changing, the tool changing device 40 is disposed on the left sidewall 13 side of the bed 11 and changes tools through a tool changing opening 13a in the left sidewall 13, and the pallet changing device 45 is disposed on the right sidewall 14 side of the bed 11 and changes the pallets through a pallet changing opening 14a in the right sidewall 14. Thus rendering the tool changing device 40 and pallet changing device 45 on the sides prevents interference with tasks performed by a worker S at the front of the bed 11.

Furthermore, when processing the work W is finished, the first table rotation drive mechanism (not shown in the figures) swivels the support unit 20b on the table 20 180 degrees on the B-axis to invert the work W on the pallet P, and cutting fluid is then discharged towards the pallet P from nozzles 56 located below the table 20 to effectively and efficiently remove any waste accumulated on or clinging to the support unit 20b, the pallet mounting unit 20a, the pallet P, and the work W. Waste and cutting fluid are thus prevented from being removed with the pallet P and work W from the machine tool unit 10. The processing cost can also be reduced because dedicated equipment for removing waste adhering to the work W is not needed.

A waste removal hole 12a is rendered as an opening in the top of the base 12 of the bed 11, and a waste recovery device 50 is disposed inside the waste removal hole 12a. Waste and cutting fluid can thus be efficiently discharged from the opening of the waste removal hole 12a in the base 12 and recovered by the waste recovery device 50.

A preferred embodiment of the present invention is described above, and it will be obvious to one with ordinary skill in the related art that the invention is not limited to this embodiment.

A tool changing device 40 and pallet changing device 45 are disposed to the machine tool unit 10 in this embodiment of the invention, but the invention is not so limited as the machine tool unit 10 could be equipped with only the tool changing device 40 or only the pallet changing device 45. In such an arrangement only the corresponding tool changing opening 13a or pallet changing opening 14a is rendered in one of the three sidewalls 13, 14, 15 of the bed 11.

The arrangement of the tool changing device 40 and pallet changing device 45 is also not limited to the preferred embodiment described above. For example, a pallet changing opening 14a can be rendered in any two of the three sidewalls 13, 14, 15 of the bed 11 so that the pallet changing device 45 delivers a pallet P from one pallet changing opening 14a and removes the pallet P from the other pallet changing opening 14a, thereby replacing the pallet P holding the processed work W on the table 20 with a new pallet P carrying unprocessed work W.

Yet further, cutting fluid is discharged from each of plural nozzles 56 in this preferred embodiment of the invention, but the invention is not so limited and the nozzles 56 could instead discharge compressed air. Furthermore, the nozzles 56 only need to be located below the table 20, and are not limited to being located directly below the table 20. The construction of the table 20 and the construction of the machine tool unit 10 are also not limited to this embodiment of the invention.

The rotational angle position of the table 20 when the cutting fluid is discharged from the nozzles 56 is also not limited to the 180 degree inverted position described above, and can be any angle of 90 degrees or more. In addition, discharging the cutting fluid from the nozzles 56 is not limited to after the table 20 has been swiveled 180 degrees on the B-axis, and the cutting fluid can be discharged while the table 20 is swiveling. In this situation the table 20 crosses the streams of discharged cutting fluid while the table 20 swivels. Swiveling the table 20 and removing waste by discharging cutting fluid are thus parallel operations, and the waste can be removed in less time and more efficiently.

Furthermore, pallets P (work W) are changed by the pallet changing device 45 in this embodiment of the invention, but a crane or other type of hoist device can be used to load the work W on the table 20 instead of using a pallet changing device 45. Work W can be efficiently loaded and unloaded from the table 20 in this arrangement because the top cover 70 opens together with the doors 61a and 61b of the first cover 61.

What is claimed is:

1. A machine tool comprising:
    a bed furnished with a rectangular base, right and left sidewalls provided standing along respective sides of the base and opposing each other across an interval, and a rear sidewall provided standing along the back of the base between the right and left sidewalls;
    a table disposed on the bed in a space surrounded by the three sidewalls of the bed;
    a first saddle having a rectangular frame shape with both lengthwise end parts supported by a top portion of the left and right sidewalls of the bed, and disposed freely movably back and forth in a horizontal plane;
    a second saddle disposed freely movably side-to-side in a horizontal plane inside the frame of the first saddle, and comprising a vertical through-hole;
    a spindle head disposed freely movably vertically inside the through-hole of the second saddle;
    a main spindle disposed over the table with the main spindle axis vertical and the main spindle supported by the spindle head freely rotatably on the main spindle axis;
    a first guide mechanism for guiding the first saddle back and forth;
    a second guide mechanism for guiding the second saddle side-to-side;
    a third guide mechanism for guiding vertical movement of the spindle head;
    a first feed mechanism for moving the first saddle back and forth;
    a second feed mechanism for moving the second saddle side-to-side;
    a third feed mechanism for moving the spindle head vertically; and
    a first rotation drive mechanism for rotating the main spindle on the main spindle axis.

2. A machine tool as set forth in claim 1, wherein the front outside surface between both lengthwise ends of the first saddle is recessed.

3. A machine tool as set forth in claim 1, wherein:
    the table is supported by the rear sidewall of the bed, can rotate freely on an axis of rotation perpendicular to the top surface of the table, and can swivel freely on a swivel axis parallel to the direction of first saddle movement; and
    the machine tool further comprises
        a second rotation drive mechanism for rotating the table on the axis of rotation and indexing the table to a specific rotational angle position; and
        a swivel drive mechanism for swiveling the table on the swivel axis and indexing the table to a specific swivel angle position.

4. A machine tool as set forth in claim 1, wherein:
    the bed comprises a tool changing opening passing from the outside to the inside through any one of the right, left, and rear sidewalls; and
    the machine tool further comprises a tool changing device for carrying tools in and out through the tool changing opening, and replacing a tool held in the main spindle with a new tool.

5. A machine tool as set forth in claim 1, wherein:
    the bed comprises a pallet changing opening passing from the outside to the inside through any one of the right, left, and rear sidewalls; and
    the machine tool further comprises a pallet changing device for carrying pallets in and out through the pallet changing opening, and replacing a pallet holding processed work on the table with a new pallet holding unprocessed work.

6. A machine tool as set forth in claim 1, wherein;
    the bed comprises a pallet changing opening passing from the outside to the inside through any two of the right, left, and rear sidewalls; and
    the machine tool further comprises a pallet changing device for carrying pallets in from one pallet changing opening and out through the other pallet changing opening, and replacing a pallet holding processed work on the table with a new pallet holding unprocessed work.

7. A machine tool as set forth in claim 3, further comprising:
a discharge means disposed below the table for discharging fluid toward the table; and
a fluid supply means for supplying and discharging the fluid from the discharge means, wherein
the swivel drive mechanism can swivel the table in at least one table swiveling direction between a first swivel angle position where the top of the table is horizontal, and a second swivel angle position where the table top is swiveled 90 degrees or more from the first swivel angle position; and
the discharge means discharges fluid supplied from the fluid supply means toward the table swiveled to the second swivel angle position by the swivel drive mechanism.

8. A machine tool as set forth in claim 3, further comprising:
a discharge means disposed below the table for discharging fluid toward the table; and
a fluid supply means for supplying and discharging the fluid from the discharge means, wherein
the swivel drive mechanism can swivel the table in at least one table swiveling direction between a first swivel angle position where the top of the table is horizontal and a second swivel angle position where the table top is swiveled 90 degrees or more from the first swivel angle position;
the discharge means discharges fluid supplied from the fluid supply means toward the table swiveled by the swivel drive mechanism to a swivel angle position of 90 degrees or more from the first swivel angle position; and
the fluid supply means supplies the fluid to the discharge means while the table is being swiveled by the swivel drive mechanism at a swivel angle position of 90 degrees or more toward the second swivel angle position.

9. A machine tool as set forth in claim 1, wherein:
the bed comprises a waste discharge opening of which one end opens to the top of the base and the other end opens to the outside of the bed; and
the machine tool further comprises a waste recovery means disposed inside the waste discharge opening for recovering waste falling from the open portion in the top of the base of the bed.

* * * * *